US009056252B2

(12) United States Patent
Shah

(10) Patent No.: US 9,056,252 B2
(45) Date of Patent: Jun. 16, 2015

(54) HIGHLY INTERACTIVE ONLINE MULTIPLAYER VIDEO GAMES

(71) Applicant: Sugarcane Development, Inc., Menlo Park, CA (US)

(72) Inventor: Sunil C. Shah, Los Altos, CA (US)

(73) Assignee: SUGARCANE DEVELOPMENT, INC., Menlo Park, CA (US)

(*) Notice: Subject to any disclaimer, the term of this patent is extended or adjusted under 35 U.S.C. 154(b) by 127 days.

(21) Appl. No.: 13/799,425

(22) Filed: Mar. 13, 2013

(65) Prior Publication Data

US 2014/0274370 A1 Sep. 18, 2014

(51) Int. Cl.
*G06F 13/00* (2006.01)
*A63F 13/30* (2014.01)

(52) U.S. Cl.
CPC ............ *A63F 13/12* (2013.01); *A63F 2300/534* (2013.01)

(58) Field of Classification Search
None
See application file for complete search history.

(56) References Cited

U.S. PATENT DOCUMENTS

| 6,415,317 | B1* | 7/2002 | Yelon et al. ................. 709/205 |
| 2005/0125150 | A1* | 6/2005 | Wang et al. ................. 701/213 |
| 2012/0053915 | A1* | 3/2012 | Falash et al. ................. 703/6 |
| 2012/0122570 | A1* | 5/2012 | Baronoff ................. 463/31 |

OTHER PUBLICATIONS

Chen, Tom C., et al., "A Protocol for Distributed Collision Detection", *IEEE; Network and Systems Support for Games (NetGames)*, 2010 9th Annual Workshop; pp. 1-6.
Claypool, Mark, et al., "Latency and Player Actions in Online Games", Nov. 2006; vol. 49, No. 11; *Communications of the ACM*; pp. 40-45.
Manweiler, Justin, et al., "Switchboard: A Matchmaking System for Multiplayer Mobile Games", *MobiSys'11*; Jun. 28-Jul. 1, 2011, Bethesda, Maryland, USA. Copyright 2011 ACM 978-1-4503-0643-0/11/06.
International Search Report and Written Opinion, Application No. PCT/US2014/020886, dated Jun. 24, 2014, 9 pages.

* cited by examiner

*Primary Examiner* — Dmitry Suhol
*Assistant Examiner* — Jason Yen
(74) *Attorney, Agent, or Firm* — Nicholson De Vos Webster & Elliott LLP

(57) ABSTRACT

Latency compensation is performed during play of a multi-player video game over a network. A first system includes a first estimator, a first player, and a first game object controlled by movement of the first player, and a second system includes at least a second player and a second game object controlled by movement of the second player. The first estimator receives data values characterizing delayed states of the second system via the network. Based on the received data values, the first estimator estimates a latency-compensated state of the second game object using a physics model of the second game object and a behavior model of the second player. The behavior model provides a representation of how the second player interacts with the video game relative to the first player. The first player is enabled to interact with the video game with compensated latency.

28 Claims, 10 Drawing Sheets

HIGHLY INTERACTIVE ONLINE MULTIPLAYER VIDEO GAMES

TECHNICAL FIELD

Embodiments of the invention relate to online multiplayer video games; and more specifically, to latency compensation for online multiplayer video games.

BACKGROUND

Game devices sense user actions through user inputs (such as joystick, buttons, etc.) and various sensors. Continuous user actions are translated by the game device to digital data streams and presented to game software. Game software updates the game states through game physics and then updates the game display and audio. User responds continuously to the changing display and audio, thus creating a closed-loop feedback system.

Real-time closed-loop systems with human-in-the-loop are sensitive to latency in the feedback loop. Games with continuous user actions show large degradation in play quality due to latency between player action and player perception. Latency typically results from multiple factors, such as data networks, game software, game display and game device sensors.

For multiplayer games with continuous multiplayer actions, this degradation is even higher because each human player is responding to perceived actions of other players, thus compounding effects of latency.

Game physics describes the evolution of each game object in the game world. Simulation of game physics on game devices or computers result in changes to game states in response to player actions. Game display software presents the game states to the players, e.g., positions and orientations of game objects in the game world. In a multiplayer game, each player typically controls at least one game object, which may interact with the game objects controlled by other players. Under latency, states of the game objects and the corresponding displayed game worlds on different player devices may diverge and lose coherence. For example, two game devices may show two different winners at the end of a racing game, or one device shows collision between game objects while the other device misses the collision. Long latency introduces significant sluggishness to the feedback of player response. Because timely user actions depend upon the displayed game objects, and the feel of the game depends upon the response of the displayed game objects to user actions, the latency degrades the quality of game play. For example, achieving a tightly controlled relative position for drafting in a car racing game becomes much harder with the increased latency.

Moreover, latency in the feedback loop varies dynamically due to variability in the network. Time-varying latency in the feedback loop makes it difficult to precisely control the movement of game objects in the game world. On mobile and wireless networks, per packet latency variability is much larger than in wired networks. For large latency variations, the player-to-player feedback loop is often destabilized, resulting in complete loss of consistency of the game states among game devices.

Current multiplayer games use server synchronization to maintain coherence. Server synchronization involves maintaining an authoritative game state on a server. Logical consistency is maintained by allowing game objects controlled by players to receive game states from the server. Getting authoritative game states and remote players inputs from the server introduces additional network hops and latency. Moreover, in server synchronization, even with constant network latency, artificial time base variation is introduced to maintain logical consistency (i.e., same order of short sequence of events). When using server synchronization of logical states, objects controlled by a peer player have a different simulation time base than objects controlled by the local self player. In other words, even when the network latency is constant, the simulations of two different players proceed at two different time scales, each may speed up and slow down as necessary to maintain a consistent short sequence of events. As a result, the relative time differences change dynamically. Simulation time base of an object may vary as the object approaches other objects. Such variations can result in non-physical object behavior.

In some current systems, game devices extrapolate and correct the motion of game objects using delayed values from the server. One known technique for extrapolating and predicting future object positions from past delayed positions, velocities and accelerations is dead reckoning. Future predictions are corrected when remote values received from the server differ from the predicted values. However, accurate dead reckoning is limited to prediction of ballistic trajectories, i.e., linear or parabolic functions of time resulting from constant acceleration. When the players engage in continuous action in response to the presented game world, prediction accuracy of dead reckoning degrades due to large changes in accelerations from reaction and contact forces among the game objects.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a method, system and apparatus for restoring the quality of game play in the presence of latency and data loss in online multiplayer video games (also referred to as "multiplayer games"). The method, system and apparatus implement a latency compensation mechanism that enables players to engage in a highly-interactive video game over a network. The latency compensation mechanism enables a user's system (also referred to as a "self player's system") to estimate the current states (also referred to as "latency-compensated states") of its peer player's system based on the delayed states sent from the peer player's system.

The latency compensation mechanism described herein exploits feedback structures of multiplayer games. Behavior models of human actions are generated for estimating the states in the feedback systems. State estimation is performed using the behavior models and physics models of game objects. The behavior model of a human peer player (also referred to as a "player model of a peer player" or a "peer player model") is used by an estimator in a self player's system. The peer player model is specific to the peer player and is also specific to the self player that plays against the peer player. The peer player model is continuously refined during real-time game play based on game play data. In one embodiment, the peer player model may also be objective-specific with respect to a distinct play objective in the game. As used herein, a game object is a simulated object in the game that is governed by game physics and player actions. It is graphically rendered on a game display. For example, a car is a game object in a car racing game, and a tennis player is a game object in a tennis game.

Figure 1:
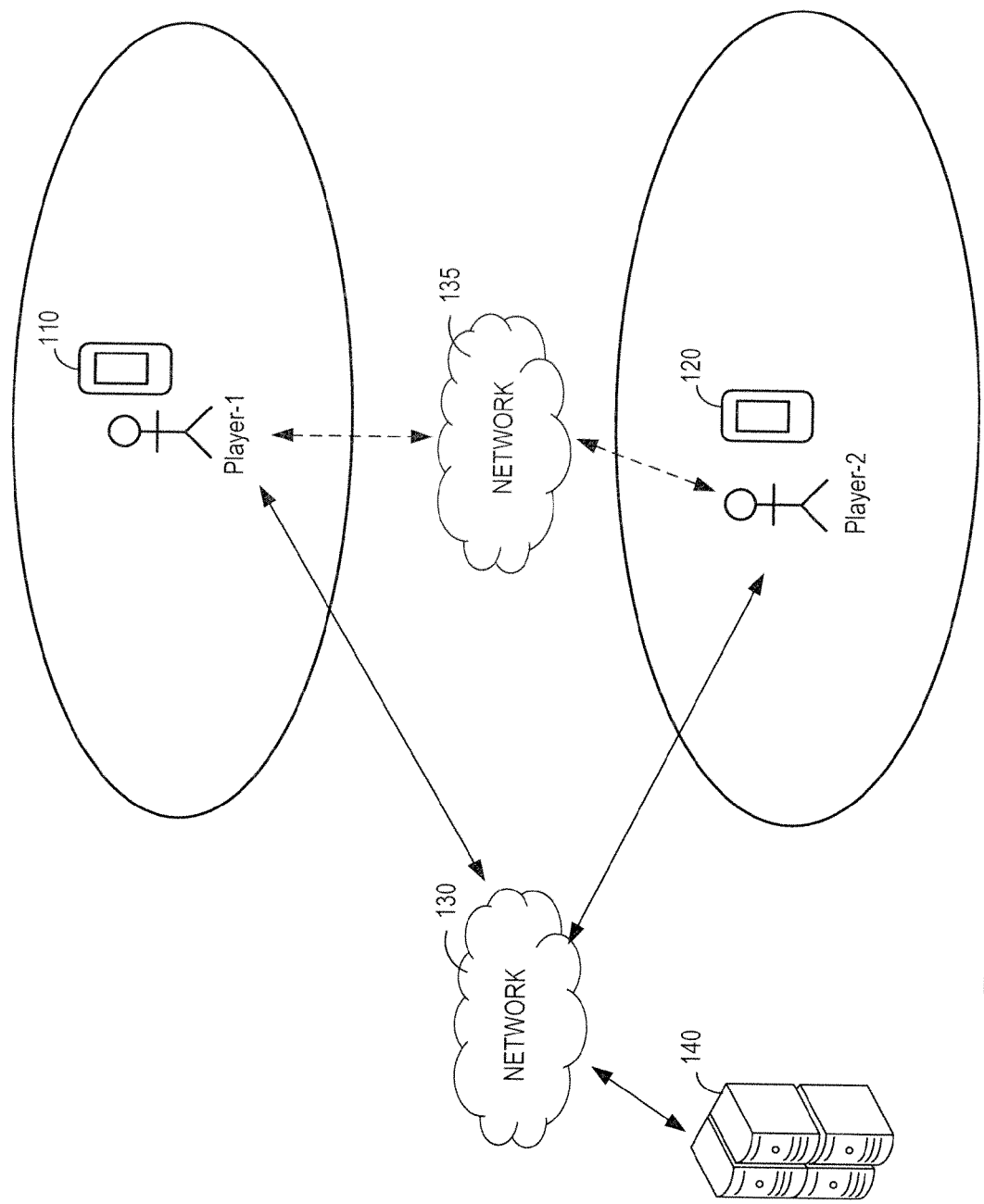
FIG. 1 illustrates a network architecture in which embodiments of the invention may operate.

FIG. 1 illustrates a network architecture in which embodiments of the invention may operate. In one embodiment, player-1 and its game device 110 interact with player-2 and its game device 120 via a network 130, which may be any combination of local area and/or wide area networks (e.g., the Internet), using wired and/or wireless communication systems. The game devices 110 and 120 exchange time-stamped data over the network 130 during real-time game play. Additionally, the game devices 110 and 120 also exchange data with a server 140 (also referred to as a "game server") over the network 130. In one embodiment, the data exchange with the server 140 may take place at the start and end of a game; e.g., when the game devices: register with the server, receive stored player models from the server, send refined player models to the server, time synchronize with the server at game start, receive updates to game software, etc. In one embodiment, the game devices 110 and 120 also send game states to the server 140 during game play for real-time and/or offline analysis. The server 140 may serve as a time server. The server 140 may include one or more server computers. In one embodiment, the game devices 110 and 120 perform the functions of the server 140.

In an alternative embodiment, the game devices 110 and 120 may exchange data during real-time game play over another network 135, which may be any combination of local area and/or wide area networks (e.g., the Internet), using wired and/or wireless communication systems. The network 135 can be different and/or separate from the network 130 to which the server 140 is connected. For example, the network 135 may be a local area network and the network 130 may be a wide area network. As another example, the network 135 may be a wireless network and the network 130 may be a combination of wired and wireless communication systems.

Although only two players are shown and described, it is appreciated that more than two players can participate in the same game play. The multiple players may be located anywhere in the world where network connections are available. Some of the players may be co-located in the same area and communicate via a local area network; some of the players may be located in geographically diverse areas and communicate via a wide-area network.

Figure 2:
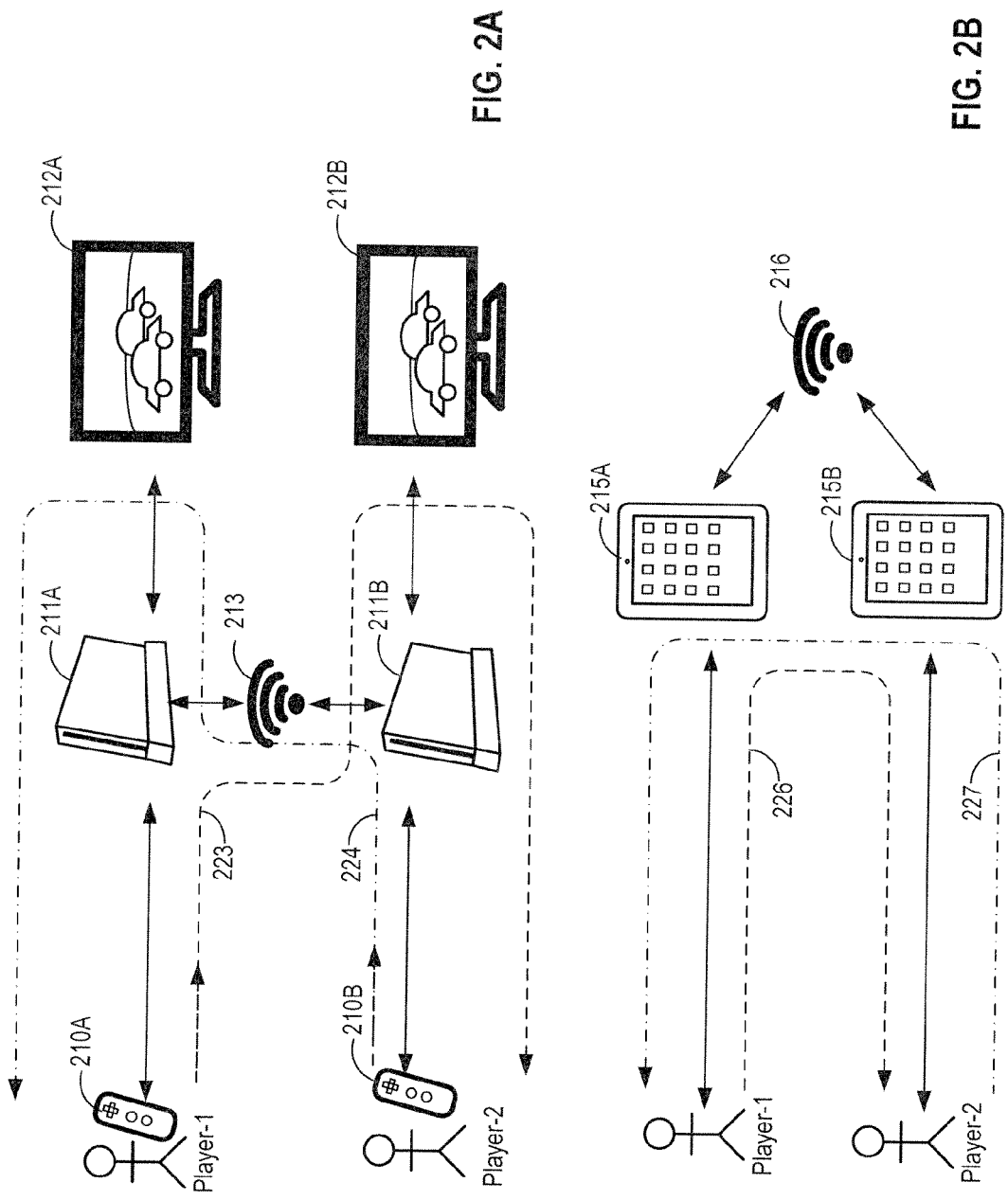
FIGS. 2A and 2B illustrate example environments in which embodiments of the invention may operate.

FIG. 2A illustrates an environment in which an embodiment of the invention may operate. In this embodiment, player-1 and player-2 are human players engaged in a multiplayer video game. Player-1 and player-2 interact via respective game controls 210A-B, respective game consoles 211A-B, respective displays 212A-B, and a network connection 213. The communications between the game controls 210A-B, the game consoles 211A-B, the game displays 212A-B, and the network connection 213 may be any combination of wired and wireless connections. The game controls 210A-B may include remote controllers, joysticks, keypads, buttons, sensors, etc., for player-1 and player-2 to control game objects displayed on the displays 212A-B. The game display 212A-B may be a TV screen, a computer display, a projector, or a graphical user interface on any electronic device.

In some embodiments, a player's game control, game console and/or game display may be integrated into one or two devices. A player controls his game object by his movement. In some embodiments, a player may control his game object by moving a control device (e.g., a joystick, a push button, a keypad, etc.). Alternatively, a player may control his game object through a sensor (e.g., an accelerometer, a gyroscope, a light sensor, a camera, etc.) by body movement without physically moving a device or components of a device (e.g., without moving a joystick, pressing a button or other game controls, etc.). Player action (also referred to as "player motion" or "player input") is read by the game device through a sensor or a control device. In some embodiments, players that are co-located in the same area (e.g., in the same room) may share the same game display and/or game console.

FIG. 2B illustrates an environment in which another embodiment of the invention may operate. In this embodiment, player-1 and player-2 are engaged in a multiplayer game using respective mobile devices 215A-B via a network connection 216. The mobile device 215A-B may be a special-purpose, multi-purpose, or general-purpose mobile device having access to a network connection for interactive online video game play. The mobile device 215A-B includes one or more built-in sensors to detect its user's movement, and an integrated display to show the game objects and the surrounding game world to its user. An embodiment of the mobile device 215A-B is described later with reference to FIG. 11B.

Thus, the term "game device" hereinafter refers to a wide range of electronic devices. A game device may be a single device that has integrated control, console and/or display. A game device may alternatively be multiple separate devices that are connected by wired/wireless connection for detecting players' movements, controlling the game objects and displaying the games. A game device may be a mobile device or a stationary device, a special-purpose, multi-purpose, or general-purpose device, a wired device or a wireless device.

FIGS. 2A and 2B also illustrate the multiple sources of latency between player-1's action and player-2's reaction, as shown with dotted lines 223, 224 and 226, 227. For example, dotted line 223 shows the latency that includes: the time it takes for detecting player-1's movement, computation of the game states based on the movement, network delays, displaying the updated game states on player-2's display, and the reaction time of player-2. The latency can be in the range of several hundred milliseconds and can be time-varying. The dotted lines 223 and 224 in combination show a close-loop feedback structure in FIG. 2A, and the dotted lines 226 and 227 in combination show a close-loop feedback structure in FIG. 2B.

The latency compensation mechanism models the following components in the close-loop feedback structures: (1) player's actions in response to what the player sees or hears on the game display or speaker, (2) effect of player's actions on physics of the game object's model, and on what is sent across the network to other player's game devices and server, (3) displaying or creating sounds based upon physics variables, networked delayed values of other game states, predictions, server supplied values and actions of local players and network delayed actions of players, and (4) delays due to computations, display, sensor processing on game controllers and game.

An example of a car racing game is described below to illustrate the latency compensation mechanism. In real-world racing sport events such as Daytona NASCAR® race, the player strategies involve drafting to gain speed advantage over rivals. Drafting involves two or more drivers maintaining a single file, maintaining constant short relative distances between the cars. The drafting configuration provides speed advantage and is a key factor for winning the game. Interactions between the cars change the relative distance between the cars, which in turn change the drag experienced by the cars. When two cars, each controlled by a player, are engaged in drafting, there is continuous force interaction between the two cars due to changing drag experienced by the cars. This continuous interaction makes this play sensitive to latency. Thus, drafting is an example of a play objective in a car racing game. In a car racing game, there are many different types of plays other than drafting, such as slingshot around a car in front, bump drafting and pushing a rival off track. Some of these plays involve coordinated action among team members, and some of these plays involve proactive or reactive action to rival players. In the following description, cars are used as an example of game objects, and drafting, bump drafting, and slingshots are used as examples of play objectives. It is appreciated that the multiplayer games described herein can be any types of games having any types of game objects and any types of play objectives.

Figure 3:
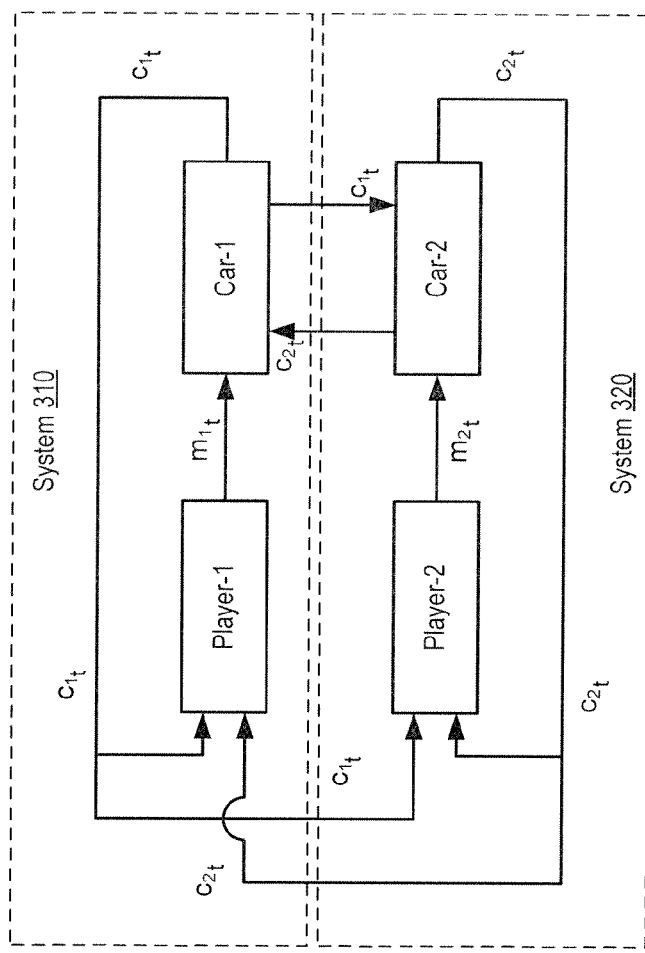
FIG. 3 is a diagram illustrating feedback structures that model a multiplayer game play without latency, according to one embodiment of the invention.

FIG. 3 is a diagram illustrating a simplified representation of the feedback structures of two systems 310 and 320 that model a multiplayer game play without latency, according to one embodiment of the invention. To simplify the discussion, it is assumed that player-1 controls car-1 and player-2 controls car-2, where car-1 and car-2 are examples of game objects. The system 310 includes player-1 and car-1, and the system 320 includes player-2 and car-2. In one embodiment, player-1 and player-2 are both human players. A close-loop feedback path goes through both players: where player-1 controls car-1, the output of car-1 is fed back to player-2, player-2 controls car-2, and the output of car-2 is fed back to player-1. Similarly, another close-loop feedback path goes through both players starting and ending at player-2. The latency-free feedback of FIG. 3 assumes that the latency of sending data between game devices is zero or negligible. Negligible latency can be accomplished during offline design, which is the design and development activity during development of the game. Solo game (between a human player and an AI player) has no latency because the game is played with an AI on a game device. Multiplayer game with no latency can be created during game development by feeding player inputs from game devices to a single game physics simulation, and then sending the game physics output to the game devices for display. Thus, during game development, the latency of sending data between game devices can be made negligible.

In the example of FIG. 3, player-1 output is the player motion $m_{1_t}$ measured by its game device sensors at time t. Car-1 physics uses the measured player motion $m_{1_t}$ to change throttle, steer and braking variables for computing car-1 states $c_{1_t}$. Car-2 states $c_{2_t}$ at time t also enter car-1 physics because of contact forces and drafting drag. The input to each player include physics states of both cars, $c_{1_t}$ and $c_{2_t}$. In a drafting play, each player maintains its controlled car at the drafting sweet spot for maximum speed advantage while staying on the track. This coordinated action requires the players to pay attention to the states of both cars.

Figure 4:
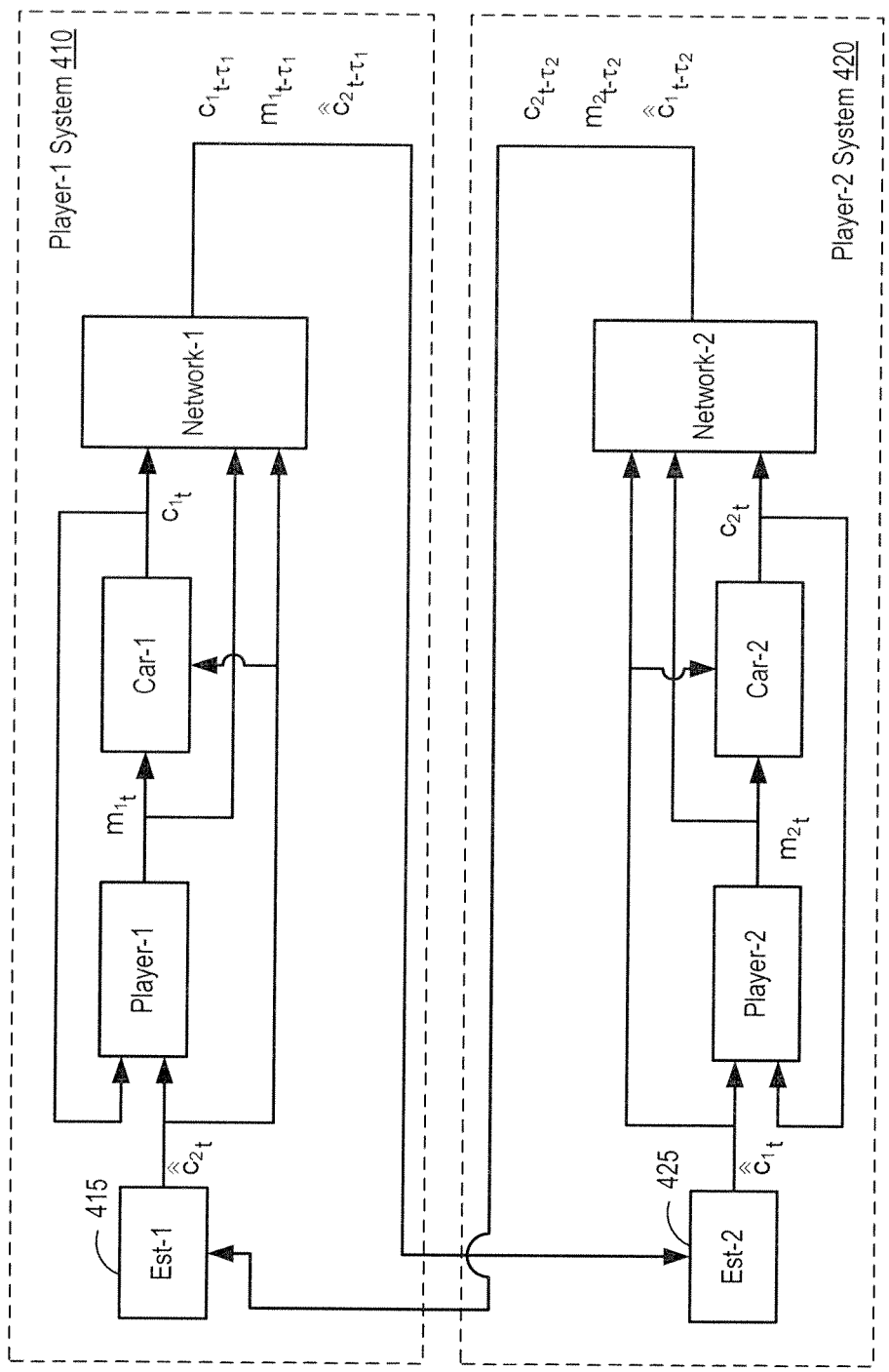
FIG. 4 is a diagram illustrating feedback structures in a multiplayer game play with latency and latency compensation, according to one embodiment of the invention.

FIG. 4 is a diagram illustrating a representation of the feedback structures in a multiplayer game play with latency and latency compensation, according to one embodiment of the invention. One objective of latency compensation is to mitigate the effects of latency so that the closed-loop behavior is restored back close to the closed-loop behavior without latency of FIG. 3. An empirical measure of closeness of the two closed-loop systems is to compare achieved game scores of players. Other measures such as closed-loop frequency responses and transient closed-loop simulations can also be used.

The system of FIG. 4 includes a player-1 system 410 and a player-2 system 420. To player-1, the player-1 system 410 is the "self system" and the player-2 system 420 is the "peer system." To player-2, the player-2 system 420 is the "self system" and the player-1 system 410 is the "peer system." Player-1 and player-2 in FIG. 4 represent real players (not their models). The player-1 system 410 generates car-1 states, player-1 motion and estimated car-2 states, and sends these as its "system states" to the player-2 system 420. With the latency $\tau_1$ introduced by network-1, the player-2 system 420 receives the delayed player-1 system states $$\left(c_{1_{t-\tau_1}}, m_{1_{t-\tau_1}}, \hat{c}_{2_{t-\tau_1}}\right).$$

Similarly, the player-2 system 420 generates car-2 states, player-2 motion and estimated car-1 states, and sends these states as its "system states" to the player-1 system 410. With the latency $\tau_2$ introduced by network-2, the player-1 system 410 receives the delayed player-2 system states $$\left(c_{1_{t-\tau_2}}, m_{1_{t-\tau_2}}, \hat{\hat{c}}_{2_{t-\tau_2}}\right).$$

Figure 5:
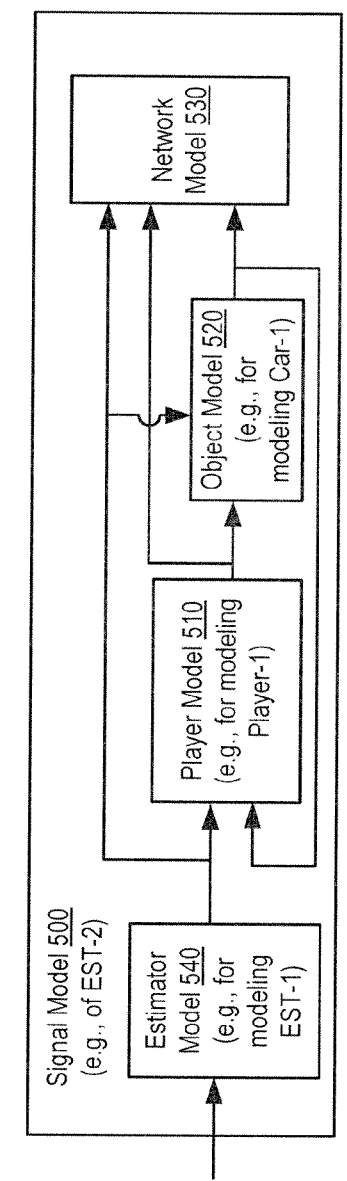
FIG. 5 is a diagram illustrating a signal model for an estimator for latency compensation according to one embodiment.

The player-1 system 410 includes a first estimator 415 (Est-1) and the player-2 system 420 includes a second estimator 425 (Est-2). Each of Est-1 and Est-2 is referred to as an estimator or a state estimator. Each of Est-1 and Est-2 can be designed and implemented according to a signal model 500, as shown in FIG. 5 according to one embodiment. The signal model 500 is an approximate model of the system whose states are being estimated. The signal model 500 used in the design of the estimator is in the feedback form. Referring to FIG. 5, the signal model 500 includes a player model 510 (which models the behaviors of the peer player), an object model 520 (e.g., a car model of the peer player's car), a network model 530 (which models the peer player's network), and an estimator model 540 (which models the estimator used by the peer system to estimate the self system state). Specifically, the signal model used in EST-1 of FIG. 4 represents the player-2 system 420 in a simplified form, and the signal model used in EST-2 of FIG. 4 represents the player-1 system 410 in a simplified form. The signal model simplification is described below where details of the estimator model 540 are provided.

The signal model 500 receives delayed states as measurements from the peer system, and generates estimated current states ("latency compensated states") of the peer system based on the measurements. In one embodiment, only some of the delayed physics states (e.g., car positions and orientations) are sent over the network to reduce traffic, provided that the estimator using the signal model 500 can accurately reconstruct the states from the available measurements.

In the signal model 500, the network model 530 describes time-varying delays and packet drops of the network that connects the two players' systems. In embodiments where time clocks on the two game devices are synchronized, time-stamped packets provide instantaneous per-packet delay measurements. Time clocks can be synchronized using protocols such as Network Time Protocol (NTP), Precision Time Protocol (PTP), or other standard network protocols for clock synchronization between computer systems over packet-switched, variable-latency data networks.

The player model 510 is the behavior model of the peer player. The player model 510 is a dynamic model. The player model 510 is represented by a non-homogenous differential equation $$\frac{dmx_t}{dt} = f_{player}(mx_t, mu_t, t)$$

a difference equation $mx_{t+1} = F_{player}(mx_t, mu_t, t)$. That is, the player model 510 has dynamic states $mx_t$ that depend upon the time history of inputs $mu_t$ to the model 510 and initial values of the states $mx_{t=0}$. Player model output motion is a function of dynamic states $m_t = h_{player}(mx_t)$. The player model 510 may be a nonlinear model. Some input components may represent random processes. In some embodiments, the player model 510 may incorporate sub-models with states that take discrete values. Hidden Markov models and Bayesian Networks are an example of such models. In one embodiment, display delays are part of the player model 510.

The object model 520 is the model of the game object controlled by the peer player. The object model 520 is a dynamic model. Similar to the player model 510, the input-output relationship for the object model 520 (e.g., a car model) is represented by a non-homogenous differential equation $$\frac{dc_t}{dt} = f_{obj}(c_t, cu_t, t)$$

or a difference equation $c_{t+1} = F_{obj}(c_t, cu_t, t)$. That is, the object model 520 has dynamic states $c_t$ that depend upon the time history of inputs $cu_t$ to the object model 520 and initial values of the states $c_{t=0}$. The object model 520 may also be a nonlinear model. Its output may not be all the dynamic states $c_t$ but be a function of $c_t$ and inputs.

Typically, the physics of the object model 520 is completely known to the game developer at game development time and is described by a computer program as part of the game software. The dynamic states of the object model 520 can be measured by the self system during game play. The player model 510, on the other hand, is not known at game development time. Its dynamic states are also not measured; only its inputs and outputs are available.

The player model 510 is player-specific; that is, it is specifically modeled according to the game playing characteristics of the peer player. As a peer player's skill improves over time, its player model 510 can be tuned during the game play to match the skill changes of the peer player. The player model 510 of the peer player is also specific to the self player who plays against the peer player. That is, the player model 510 not only captures the characteristics of the peer player but also the interaction between the self player and the peer player in a game play. Further details of the player model 510 will be described later with reference to FIG. 9.

The estimator model 540 models the estimator of the peer system. That is, the estimator model 540 within Est-1 (FIG. 4) models Est-2, while the estimator model 540 within Est-2 (FIG. 4) models Est-1. Referring again to FIG. 4, Est-1 estimates states $c_2$ of the car-2 model using delayed values received from the player-2 system 420 up to $$c_{2_{t-\tau_2}}, m_{2_{t-\tau_2}}, \hat{\hat{c}}_{2_{t-\tau_2}}.$$

The estimated car-2 states output by Est-1 is:

$$\hat{c}_{2_t} = E\left\{c_{2_t} \mid c_{1_{t-\tau_2}}, m_{1_{t-\tau_2}}, \hat{\hat{c}}_{2_{t-\tau_2}}, \ldots \right\}.$$

Similarly, Est-2 estimates states $c_1$ of the car-1 model using delayed values received from the player-1 system 410 up to $$c_{1_{t-\tau_1}}, m_{1_{t-\tau_1}}, \hat{\hat{c}}_{2_{t-\tau_1}}.$$

The estimated car-1 states output by Est-2 is:

$$\hat{\hat{c}}_{1_t} = E\{c_{1_t} | c_{1_{t-\tau_1}}, m_{1_{t-\tau_1}}, \hat{\hat{c}}_{2_{t-\tau_1}}, \ldots \}.$$

Because each estimator uses the signal model 500 of its peer system, which in turn needs the state estimator in the self system, there is a recursive definition. In one embodiment, this impasse is overcome by replacing the estimator used by the peer with a simplified estimator model. One such simplification is to replace the estimator by an additive noise model. Thus, Est-2 may include a simplified estimator model for estimating the output of Est-1: $\hat{\hat{c}}_{2_t} = c_{2_t} + wn_t$, wherein $wn_t$ is the white noise. For Est-2, $c_{2_t}$ is a locally known input. Similarly, Est-1 includes an estimator model for estimating the output of Est-2: $\hat{\hat{c}}_{1_t} = c_{1_t} + wn_t$. For Est-1, $c_{1_t}$ is a locally known input.

Another simplification of the estimator model 540 uses a process driven by only white noise, where $\hat{\hat{c}}_{2_{t+1}} = \hat{\hat{c}}_{2_t} + dc_{2_t}$, and $dc_{2_{t+1}} = dc_{2_t} + wn_t$.

Figure 6A:
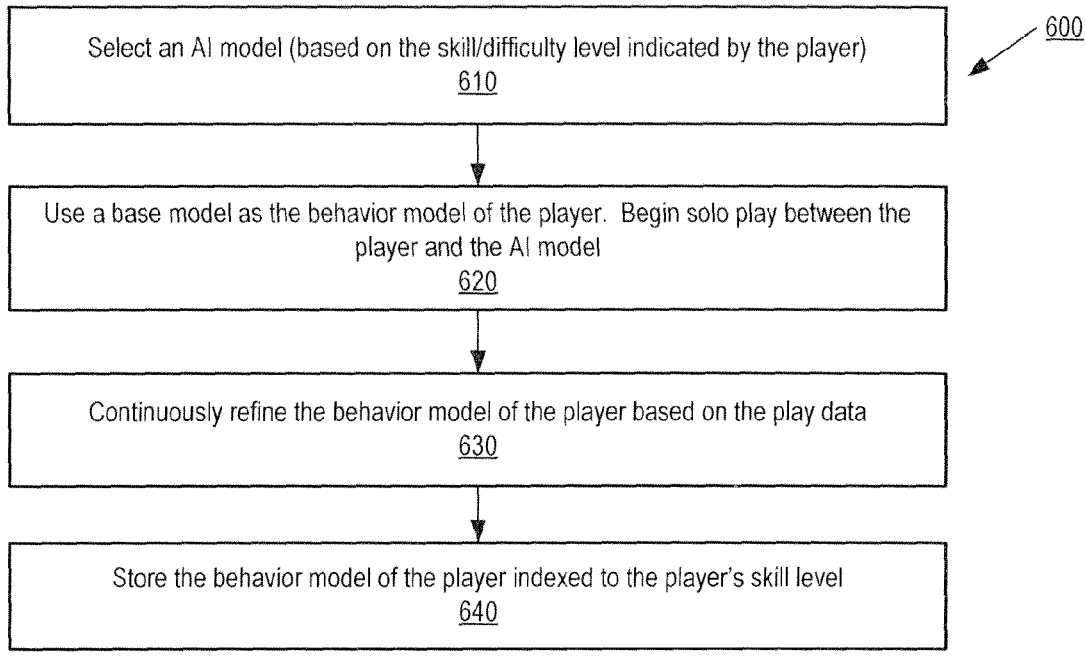
FIG. 6A is flow diagram of a method for creating and tuning a player-specific player model based on solo play data, according to one embodiment of the invention.

FIG. 6A is a flow diagram of a method 600 for creating and tuning a player-specific player model (e.g., the player model 510 of FIG. 5) based on solo play data, according to one embodiment of the invention. The term "solo play" herein refers to a game between a human player (player) and an Artificial Intelligence (AI) model. The method 600 may be performed during an offline development of the game; e.g., when developing player models of different skill levels for the game. The method 600 may be performed by the game device of the player, such as the game device 1110 of FIG. 11B.

The method 600 starts with the game device selecting an AI model to play against the player (610). In one embodiment, the AI model may be selected based on the player's skill level or a difficulty level selected or indicated by the player. If neither a skill level nor a difficulty level is indicated, a default AI model may be selected. In one embodiment, the AI models may be indexed by psycho-motor feedback properties and skill levels, and may be stored on the game device or obtained by the game device from a server. An AI model can provide constant challenge to the player. An AI model also helps the game device to obtain player data in feedback, i.e., the excitations and the operating regions needed to rapidly identify or construct an appropriate player model for the player. The player model may be constructed by estimating model parameters and structure.

After the AI model is selected, the game device begins solo play between the player and the AI model, and identifies the behavior model of the player based on play data during the sole play (620). During the solo play, the game device also continuously refines the behavior model of the player based on the solo play data (630). The game device tunes the behavior model to the player as his skill improves. Alternatively or additionally, the behavior model of the player may be tuned by a server, such as the server 140 of FIG. 1. For example, the game device may send the play data to the server which tunes the player model as the game is played. Based on the solo play data, the player's skill level is also identified. At the end of the game, the game device stores the behavior model of the player, where the behavior model is indexed to the player's skill level (640). The game device may store the player model in its data storage such as the memory. Alternatively or additionally, the behavior model of the player may be stored in the data storage of a server computer that hosts or manages the game, such as the server 140 of FIG. 1, and/or another data storage location accessible by the server computer.

Player models developed during a solo play are to be used as a starting point during a multiplayer game play. A self player's behavior model is to be used by his peer player during live multiplayer game play. As described above with reference to FIG. 5, the behavior model of a self player is used by the estimator of the peer player's game device as an element of the signal model in feedback form.

Figure 6B:
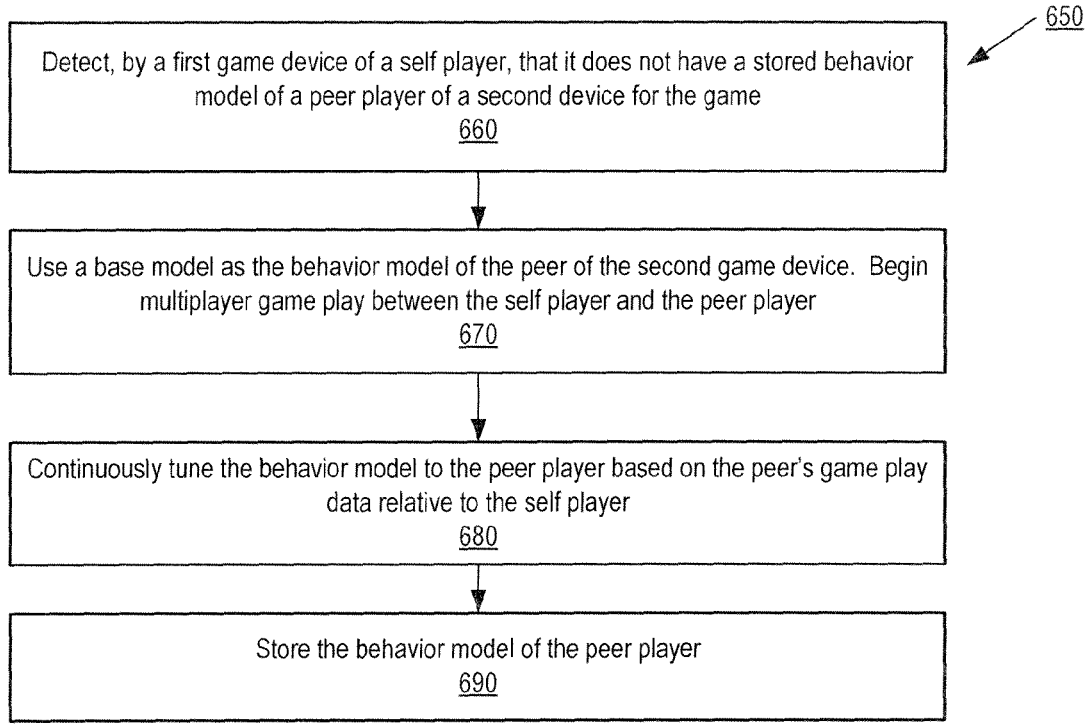
FIG. 6B is flow diagram of a method for creating and tuning a player-specific player model based on multiplayer game play data, according to one embodiment of the invention.

FIG. 6B is a flow diagram of a method 650 for creating and tuning a player model (e.g., the player model 510 of FIG. 5) based on game play data between at least two human players (a self player and a peer player) according to one embodiment of the invention. The method 650 may be performed by the game device (first game device) of the self player who plays against a second game device of the peer player, such as the game device 1110 of FIG. 11B.

The method 650 starts with the first game device detects that the device does not have a stored behavior model for the peer player of the second game device for the game (660). The first game device uses a pre-built base (nominal) model as the behavior model of the peer player; e.g., a base model that is selected based upon a known skill level of the peer player, and is selected from stored player models that are indexed to skill levels as described in FIG. 6A. The first game device then begins game play between the self player and the peer player (670). During the game play, the first game device continuously refines and tunes the behavior model to the peer player model based on the game play data of the peer player relative to the self player (680). At the end of the game, the first game device may store the behavior model of the peer player in its data storage such as the memory (690). Alternatively or additionally, the behavior model of the peer player may be stored in the data storage of a server computer that hosts or manages the game, such as the server 140 of FIG. 1, and/or another data storage location accessible by the server computer.

During the solo play of FIG. 6A and the multiplayer game play of FIG. 6B, the player may engage in a sequence of play actions for achieving a play objective that changes from time to time. For example, a self player of a car racing game may engage in starting the car, followed by drafting, bump drafting, and then slingshot. Each of the starting, drafting, bump drafting, and slingshot is a distinct play objective. In one embodiment, during solo play in the offline development of the game, the self player may perform a distinct maneuver to achieve each of the distinct play objectives to adapt the self player's model to the different play objectives. In one embodiment, the behavior model of a self player that is constructed or refined by the methods 600 and 650 includes multiple sub-models, each sub-model being specific to a different play objective. After the behavior model is created and stored, the behavior model is made available to other players who play against the self player.

Figure 7:
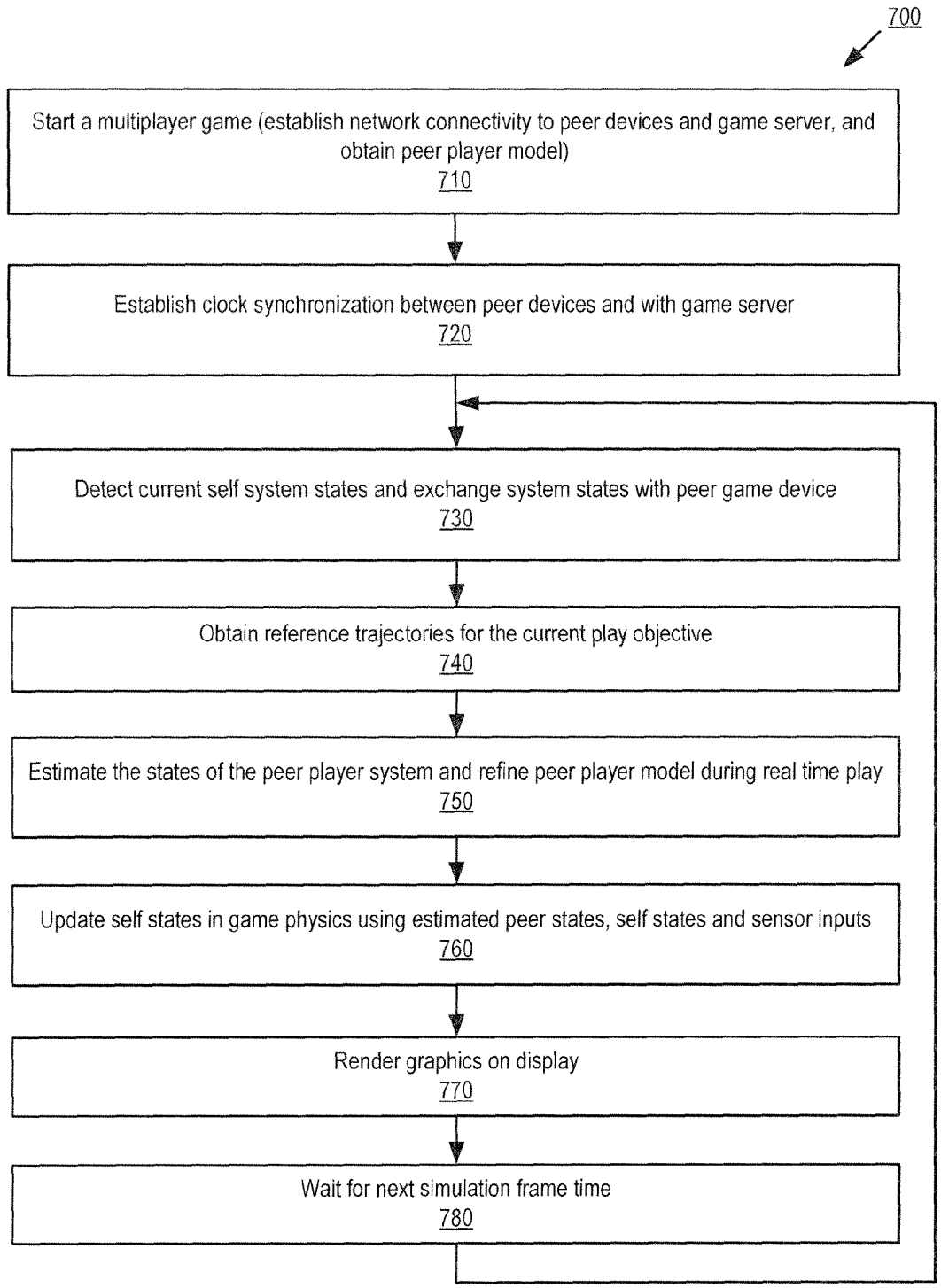
FIG. 7 is a flow diagram of a method of latency compensation for a multiplayer game using a player-specific and objective-specific player model, according to one embodiment of the invention.

FIG. 7 is a flow diagram of a method 700 of latency compensation for a multiplayer game using a self-player-specific, peer-player-specific, and objective-specific player model, according to one embodiment of the invention. The method 700 may be performed by the game device of a self player, such as the game device 1110 of FIG. 11B.

The method 700 begins with the game device of a self player starting the multiplayer game (710). In one embodiment, the game device executes operations for starting up the game by establishing network connectivity to a peer game device and a game server, and by obtaining a behavior model of the peer player. Clock synchronization is established between peer game devices and with game server (720). The game device of the player then obtains self system states and exchanges system states with the peer game device (730). Further details of the operation (730) will be described below with reference to FIG. 8A. The game device also obtains reference trajectories for the current play objective (740). Further details of the operation (740) will be described below with reference to FIG. 8B. The game device estimates the states of the peer system and refines the player model of the peer player during real-time game play (750). The game device further updates self states in game physics using estimated peer states, self states and sensor inputs (760). Based on the states of the self system and the estimated states of the peer system, the game device renders the graphics of the game world on the display of the game device (770). The game device may additionally generate sounds or other effects of the game. The game device then waits for the next simulation time frame (780), upon which the operations of blocks 730-780 are repeated.

Figure 8A:
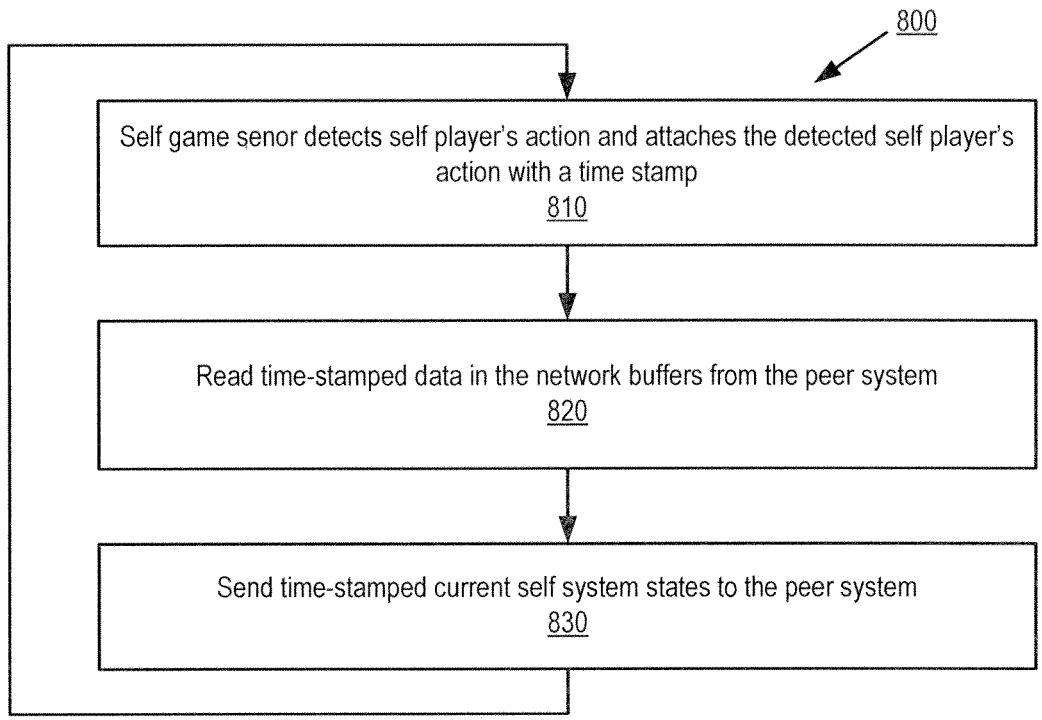
FIG. 8A is a flow diagram illustrating a method of exchanging system states with the peer system, according to one embodiment of the invention.

FIG. 8A is a flow diagram illustrating a method 800 of exchanging system states between a self system and a peer system, according to one embodiment of the invention. The method 800 provides further details of the operation (730) of FIG. 7. The method 800 may be performed in the background; e.g., in parallel with the operations of 730-780, by the game device of the self player such as the game device 1110 of FIG. 11B.

The method 800 begins with the sensor of the self player's game device detecting the self player action and the game device attaching detected player action with a time stamp (810). The game device of the player reads received time-stamped data in the network buffers from the peer system (820). The time-stamped data describes the delayed system states of the peer system. The game device of the self player also sends time-stamped current system states to the peer system (830). The current system states include sensor read, inputs to the self player (such as the position and orientation of the car controlled by the self player), and other states of the game objects and the self player. All data are time-stamped. The network sends and receives are non-blocking asynchronous. The method 800 repeats throughout the process of game play.

Figure 8B:
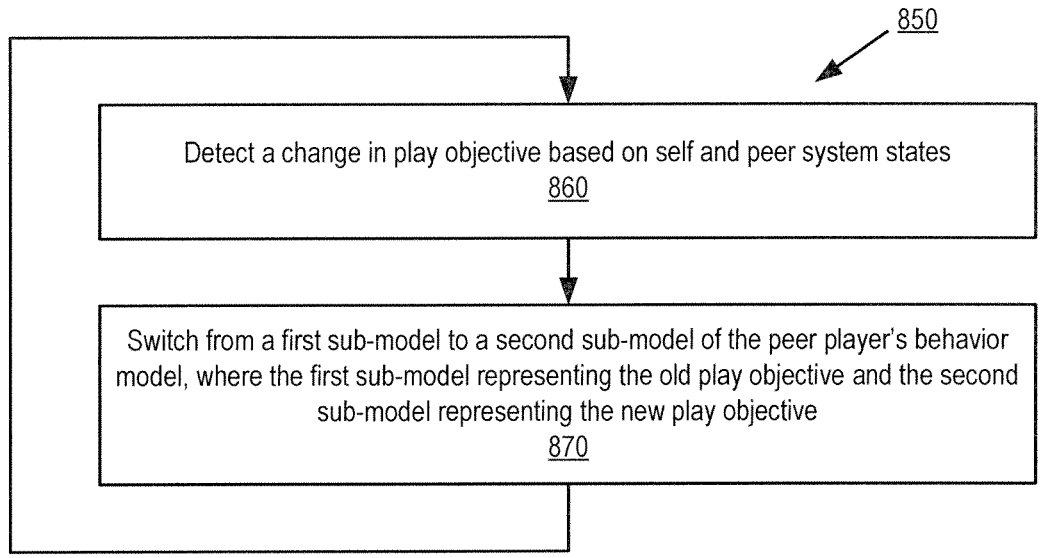
FIG. 8B is a flow diagram illustrating a method of determining a current play objective, according to one embodiment of the invention.

FIG. 8B is a flow diagram illustrating a method 850 of determining current play objective, according to one embodiment of the invention. The method 850 provides further details of the operation (740) of FIG. 7. The method 850 may be performed in the background; e.g., in parallel with the operations of 730-780, by the game device of the self player such as the game device 1110 of FIG. 11B.

The method 850 begins with the game device of the self player detecting a change in the play objective based on self and peer system states (860). In one embodiment, change in play objective is inferred by a deviation of game object states from the reference value by an amount exceeding a threshold value. In an alternative embodiment, a change is detected when the prediction error between measurement and prediction for the self or peer system exceeds a threshold value in the state estimator. State estimators corresponding to the current play objective and other possible play objectives can be run in parallel. Upon detecting the change, the game device switches from one (first) sub-model to another (second) sub-model of the peer player's behavior model, where the first sub-model represents the old play objective and the second sub-model represents the new play objective (870), which is corresponding to a lower value of prediction errors at this time. This second sub-model of the peer player is specific to the new play objective and the peer player, and is used for the subsequent state estimation. The method 850 repeats throughout the process of game play.

The above description explains the operations of multi-player game play performed by a game device. The description that follows provides further details of the player model 510 and the state estimation performed by the estimator using the signal model 500 of FIG. 5.

Figure 9:
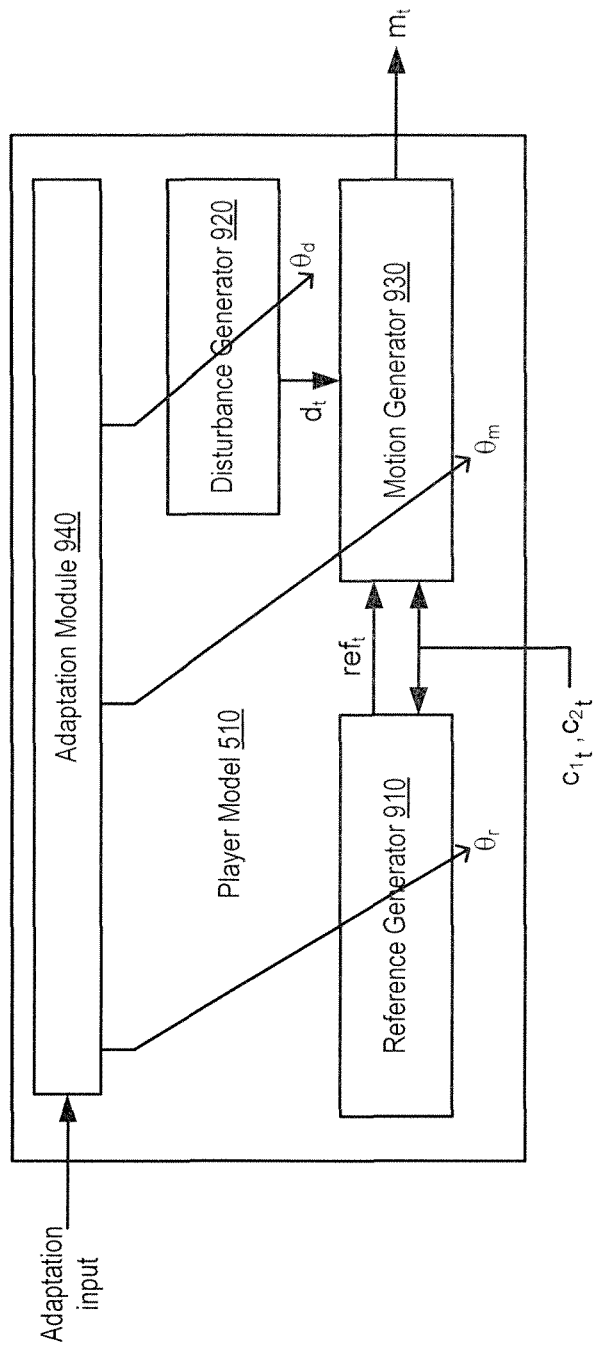
FIG. 9 is a diagram illustrating a player model according to one embodiment of the invention.

FIG. 9 illustrates a player model (such as the player model 510 of FIG. 5), according to one embodiment of the invention. The player model 510 is used by the estimator 1000 (of FIG. 10) to estimate the states of the peer player. The player model 510 includes a reference generator 910, a disturbance generator 920 and a motion generator 930, each of which is coupled to an adaptation module 940 that automatically tunes the player model 520 during real-time game play to the behavior of the peer player. The reference generator 910 generates reference trajectories $ref_r$, the disturbance generator 920 generates a process noise $d_r$, and the motion generator 930 generates an estimated player motion $m_r$. For a car racing game, the input to the player model 510 includes the states of both cars, $c_1$, $c_2$, and adaptation input; the output is player motion $m_r$ of the peer player.

The motion generator 930 is the core of the player model 510 for generating estimated player motion. The motion generator 930 receives $d_r$, $ref_r$, $c_1$, $c_2$ as input and generates player motion $m_r$ as output. The motion generator 930 models player behavior in a game play, which is a projection of real-life psycho-motor and cognitive behaviors of humans. The psycho-motor behavior acts at time scale of tens of milliseconds (e.g., 40 ms) to a few seconds, but has limited resources (e.g., memory). The cognitive behavior acts at a longer time scale, but is deliberative, associative and highly resourceful. The two behaviors act in concert to form the player model 510. The model of psycho-motor behavior is typically described by continuous dynamical equations acting together in feedback within a continuous physical dynamical system. The model of psycho-motor behavior adapts to the environment and refines with skill improvements. Stochastic processes accounting of uncertainties are also needed to effectively model the psycho-motor behavior. On the other hand, the model of cognitive behavior is more naturally represented in discrete spaces with associated Bayesian distributions. The interplay between cognitive and psycho-motor behaviors can be best represented by a combination of continuous and discrete space representations, i.e., a hybrid representation. Similarly, physics based character models may use hybrid representations.

The player model 510 can be described hierarchically. At the lowest level, the player motion represents the local dynamical behavior in a psycho-motor time scale covering tens of milliseconds to a few seconds. At a higher level, the player motion represents the cognitive behavior covering time scales of seconds to tens of seconds. For example, continuous action of adjustments by players to maintain a formation is at psycho-motor scale, while deciding to abandon formation and defect from team play is at the cognitive time scale. When the player cognitive state changes upon defecting from team play, the psycho-motor behavior also changes. The change of cognitive state is a change of play objective, which can be implemented as a change to the type of reference trajectory for the player's vehicle, e.g., from drafting behind to pushing peer player off track. In one embodiment, the player model 510 includes a number of sub-models, each representing a distinct cognitive behavior for a specific play objective. For each play objective, the sub-model describes the player motion in a psycho-motor time scale.

The reference generator 910 generates reference trajectories. The reference trajectories describe optimal movement of the game objects with respect to a current play objective. The optimal movement can be shown on the display to provide guidance (which is a feed-forward component) to the player for achieving the current play objective. For example, if the game display clearly highlights the relative car position and the drafting sweet spot, and provides cues to encourage the players to move to the sweet spot, then the player model 510 may use relative car positions $c_1$-$c_2$, as inputs instead of the individual car positions. Track geometry and stationary obstacles also enter the calculation of the optimal movement as constraints to the movement. The desired relative car positions $c_1$-$c_2$, and the desired position relative to the track form a time-varying reference trajectory. The reference generator 910 may be modeled using a direct kinematic specification such as relative position and orientation of the cars as a function of time. Continuous functions of time can be compactly represented by splines or Hermite polynomials. For example, during drafting on a straight track, maintaining constant relative position of the cars minimizes drag modeled in game physics. Alternatively, reference generator 910 may also be modeled as outputs of a dynamic system. In some embodiments, goal seeking (such as trajectory optimization with constraints) and game theoretic representations (such as coordination, pursuit evasion, etc.) with bounded rationality (limited horizons) algorithms are used to generate typical continuous reference trajectories and models.

Disturbances also enter the player model 510 arising from inherent randomness in player actions, drift and errors in sensors that pick up player actions through device motions and inaccuracy in perception of player. The disturbance generator 920 generates a process noise $d_t$ to represent this inherent randomness.

The player model 510 is adaptable; its adaptation parameters can change during real-time game play. In one embodiment, coefficients of a linear difference (or differential) equation adapt during live play using actual play data. This adaptation occurs on the game device during live multiplayer game play. In one embodiment, the adaptation parameters of the reference generator 910, the disturbance generator 920 and the motion generator 930 are represented by $\theta_r$, $\theta_d$, $\theta_m$, respectively, each of which follows a slow random walk process: $\theta_{t+1} = \theta_t + \eta_t$, where $\theta$ is any one of $\theta_r$, $\theta_d$, $\theta_m$. In this case, covariance of the noise process in the random walk is the adaptation input to the adaptation module 940.

In one embodiment, the adaptation of the player model 510 parameters is achieved by augmenting the signal model states in the estimator. In another embodiment, the player model adaptation uses delayed peer system inputs and outputs of the motion generator 930 ref$_t$, $c_1$, $c_2$, $m_t$ to estimate changing parameters $\theta_r$, $\theta_d$, $\theta_m$. For example, the parameter $\theta_r$ of the reference generator 910 can be computed from car states (e.g., car position on the track) and cognitive scale models.

Figure 10A:
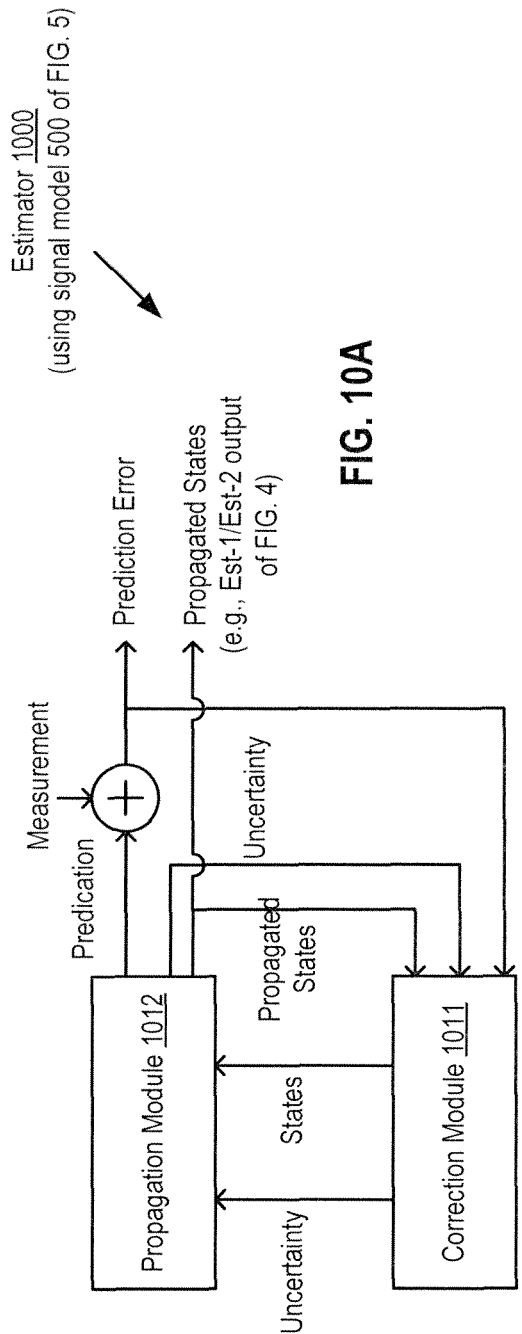
FIG. 10A is a diagram illustrating an estimator according to one embodiment of the invention.

FIG. 10A is a diagram illustrating an estimator 1000 using the signal model 500 for estimating the system states of a peer system, according to one embodiment of the invention. As mentioned above, the estimator 1000 may be the estimator Est-1 or Est-2 of FIG. 4. The estimator 1000 predicts current states of the peer cars given partial information about the past states of the peer and current states of the self system. More specifically, the estimator 1000 uses only local car states and delayed measurements received from the network. State estimation in a non-linear dynamic system can be performed by an extended Kalman Filter, Ensemble Kalman Filter, a Particle Kalman Filter, or other non-linear filters. These Kalman Filters generate state estimates as well as state covariance or ensemble sample distributions.

In one embodiment, the signal model 500 of the peer system is assembled for generating the measurements and state evolution. Non-linear Kalman Filters use standard state transition signal models:

$$x_{t+1} = f(x_t, u_t, w_t, t),$$

and measurement equation:

$$y_t = h(x_t, u_t, t) + v_t,$$

where, $v_t$, $w_t$ are independent normal random processes.

The non-linear Kalman Filter generates approximation of state estimate:

$$\hat{x}_t = E\{x_t | y_t, y_{t-1}, \ldots\}.$$

To apply the non-linear Kalman Filter as described above to the particular signal model 500 (e.g., Est-2), states $x_t$ of the signal model in feedback form for Est-2 are $$[mx_{1_t}, c_{1_t}, x_{network_{1_t}}],$$

where $mx_{1_t}$ is the state of the player-1 model, $c_{1_t}$ is the state of the car-1 model, and $$x_{network_{1_t}}$$

is the state of the network model of player-1 system. The propagation equations of the signal model follow the dependency shown in FIG. 5 where the Est-1 model (the estimator model 540) is replaced by additive noise model simplification. Given the current states $$[mx_{1_t}, c_{1_t}, x_{network_{1_t}}],$$

Est-2 computes player-1 model output first, and then the car-1 model output. This is because player model has non-zero psycho-motor latency; thus, its output is computable from the player states alone without needing the current input to the player model block. After the internal inputs needed for each block in the feedback form are computed, these block inputs and $c_{2_t}$ (for the additive noise simplification of recursion) are used to propagate each block state to the next time instant $$[mx_{1_{t+1}}, c_{1_{t+1}}, x_{network_{1_{t+1}}}].$$

Alternatively, state estimation can be limited to a delayed state value corresponding to the measurement packets received from the peer system. In that case, a separate state propagation needs to be run over the delay for the measurement packets to bring prediction to the current time.

As described above in connection with FIG. 5, the signal model 500 includes the peer player model and peer car model in a feedback form. In addition, the signal model 500 includes a simplified peer estimator model (for self states) and a time-varying network latency model. Network latency of each received packet can be obtained using time stamped data and a synchronized time clock. In one embodiment, the network can be modeled as a discrete time delay line at the output of the feedback loop. In some embodiments, a fixed-length delay line of sufficiently long delay is modeled to avoid the time-varying state dimension in the non-linear estimators. Time variation of latency is then modeled by picking the particular observed time latency for the packet in the fixed-length delay line. For example, if the observed packet latency is 210 ms at a frame rate of 30 ms, 7 frame delays are modeled by picking the output of the seventh state in the delay line. Fractional delays are handled by interpolation from the nearest two discrete delays.

The following description provides implementation details of an Extended Kalman Filter according to one embodiment. At game start t=1, estimator states $\hat{x}_{t|t-1}$ and the state uncertainty covariance (or square roots $S_{t|t-1}^T$) are initialized using common shared values. These may be obtained from the game server or from one of the peers. Initial covariance $S_{t|t-1}^T$ may be tuned and tested in an offline design for robust closed-loop behavior. Noise covariances, $R_t^T R_t = \text{cov}(v_t)$ and $Q_t^T Q_t = \text{cov}(w_t)$ can be obtained directly from system identification of player models. A linear autoregressive model with external inputs (ARX) model or an autoregressive-moving-average model with external inputs (ARMAX) model obtained by system identification techniques provides input-output dynamics, as well as dynamics and statistics of an additive disturbance generator. This statistics appears in the elements of noise covariance, which is corresponding to player model disturbance generator 920 of FIG. 9.

At each time t, the estimator 1000 performs the following operations: (1) state uncertainty correction, (2) state correction and (3) state propagation. State uncertainty correction and state correction operations are performed by a correction module 1012, and state propagation operation is performed by a propagation module 1011. Each of the operations is described below according to one embodiment.

In one embodiment, state uncertainty correction can be performed at time t, by the following QR decomposition:

$$\begin{bmatrix} R_t^{eT} & K_t^T \\ 0 & S_{t|t}^T \end{bmatrix} = Q \begin{bmatrix} R_t^T & 0 \\ S_{t|t-1}^T H_t^T & S_{t|t-1}^T \end{bmatrix}$$

State correction is performed using measurement prediction error $(y_t - \hat{y}_{t|t-1})$, where the measurements are the delayed states received from the peer system:

$$\hat{x}_{t|t} = \hat{x}_{t|t-1} + K_t (R_t^e)^{-1} (y_t - \hat{y}_{t|t-1})$$

State uncertainty propagation is performed using the following QR decomposition:

$$\begin{bmatrix} S_{t+1|t}^T \\ 0 \end{bmatrix} = Q1 \begin{bmatrix} S_{t|t}^T & F_t^T \\ Q_t^T & G_t^T \end{bmatrix}$$

State propagation can be performed using the signal model (for an Extended Kalman Filter):

$$\hat{x}_{t+1|t} = f(\hat{x}_{t|t}, u_t, w_t=0, t),$$

$$\hat{y}_{t+1|t} = h(\hat{x}_{t+1|t}, u_t, t),$$

where $R_t^T R_t = \text{cov}(v_t)$, $Q_t^T Q_t = \text{cov}(w_t)$, and $$F_t = \frac{\partial f}{\partial x_t}, G_t = \frac{\partial f}{\partial u_t}, H_t = \frac{\partial h}{\partial x_t}.$$

For an Ensemble Kalman Filter, state propagation is replaced by ensemble propagation of ensemble samples. For each ensemble member i of the Ensemble Kalman Filter:

$$\hat{x}_{t+1|t}^i = f(\hat{x}_{t|t}^i, u_t, w_t^i, t),$$

$$\hat{y}_{t+1|t}^i = h(\hat{x}_{t+1|t}^i, u_t, t) + v_t^i.$$

State covariance update is computed as the sample covariance of the ensemble member states $\hat{x}_{t+1|t}^i$.

Measurement update of states using prediction error and state uncertainty update for each ensemble member is carried out efficiently with matrix arithmetic operations linear in state dimension and in the size of the ensemble. There is no need to compute the linearization of signal model needed in the Extended Kalman Filter. Signal models used for Extended Kalman Filter need to be smooth enough so that the differentiation can be carried out. Ensemble Kalman Filters do not require differentiation.

Figure 10B:
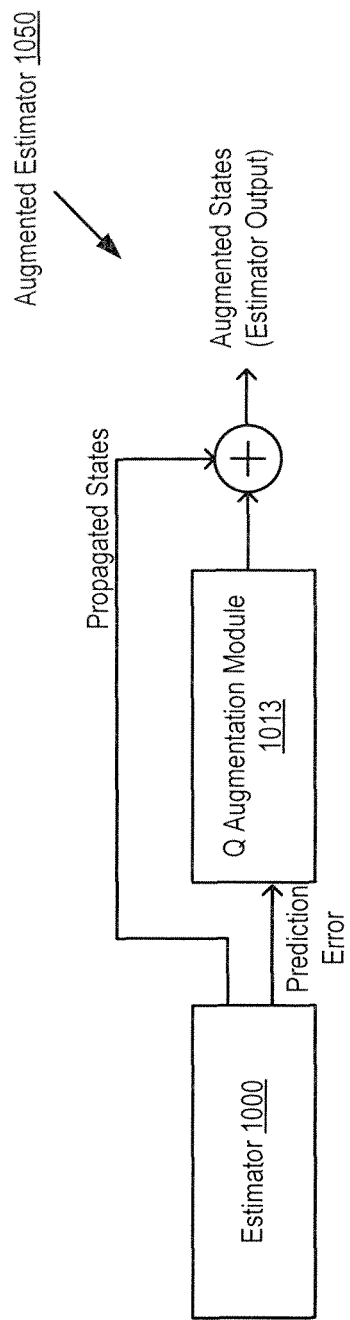
FIG. 10B is a diagram illustrating an augmented estimator according to one embodiment of the invention.

The estimator 1000 is an example use of state estimation to directly replace the peer states at run time. In one embodiment as shown in FIG. 10B, this type of direct compensation may be augmented (e.g., by a Q augmentation module 1013) so that the resulting feedback system is more robust. During the offline design, robustness of the resulting feedback system to uncertainty in the player models is evaluated and then the feedback system is augmented to increase robustness. The augmentation is a stable adaptable dynamical element whose inputs are prediction errors in measurements and the output adds to direct compensation output. In one embodiment, Q augmentation is a linear Finite Impulse Response filter with adaptable tap weights. In an alternative embodiment, Q augmentation is Laguerre filter with adaptable tap weights. The offline design to improve robustness consists of constructing a linearized model of the system in FIG. 4 with the nominal player models. Next, the uncertainty in the player model is represented as an additive or multiplicative uncertainty with a bound. Next, the values of adaptable tap weights are computed by convex numerical optimization to ensure stability and recovery of closed-loop response to the one without latency as in FIG. 3.

Figure 11B:
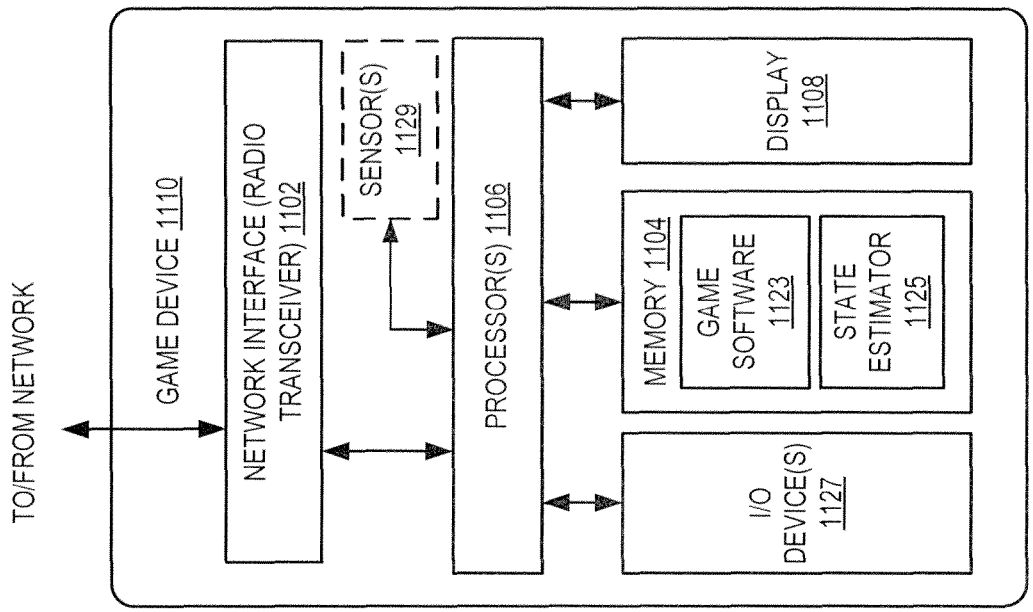
FIG. 11B is a diagram illustrating a game device according to one embodiment of the invention.
Figure 11A:
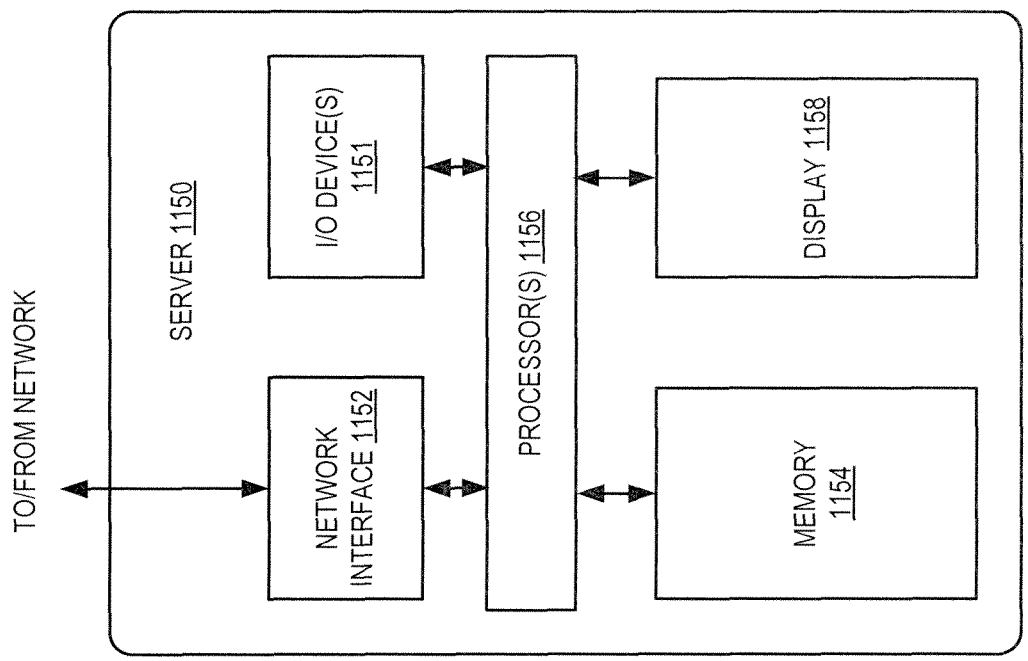
FIG. 11A is a diagram illustrating a server according to one embodiment of the invention.

FIG. 11A is a diagram illustrating a server 1150 according to one embodiment. To avoid obscuring the embodiment, some components of the server 1150 are not shown. The server 1150 may be the server 140 of FIG. 1. In this embodiment, the server 1150 includes one or more processors 1156, memory 1154, one or more I/O devices 1151, a network interface 1152 and a display 1158. The memory 1154 includes one or more of the following: read-only memory (ROM), flash memory, dynamic random access memory (DRAM), static memory and data storage device. The network interface 1152 communicates via an external data network, such as the network 130 of FIG. 1, with game devices.

FIG. 11B is a diagram illustrating a game device 1110 (also referred to as a "processing device") according to one embodiment. To avoid obscuring the embodiment, some components of the game device 1110 are not shown. The game device 1110 may be the game devices 110 and 120 of FIG. 1. The game device 1110 may have its components integrated within a device casing, such as the game devices 215A-B of FIG. 2B. Alternatively, the game device 1110 may have separated and interconnected components, such as the 210A-B, 211A-B, and 212A-B of FIG. 2A. The game device 1110 may be a mobile phone, a tablet computer, a smart phone, a laptop computer, an electronic reading device, a desktop computer, a notebook, a netbook, a personal digital assistant (PDA), a game console, or any electronic device that has access to a network connection for interactive online video gaming. The game device 1110 has wired and/or wireless communication capabilities. The game device 1110 may be a mobile device or a stationary device. The game device 1110 may be a special-purpose, multi-purpose, or general-purpose device.

In the embodiment shown, the game device 1150 includes a network interface 1102, one or more processors 1106, memory 1104, one or more I/O devices 1127 (e.g., keypad, joystick, speaker, etc.) and a display 208. For a game device that has wireless communication capabilities, the network interface 1102 may include a radio transceiver for communicating with base stations using wireless radio communication protocols. In some embodiments, the game device 1110 may also include one or more sensors 1129 (e.g., accelerometer, gyroscope, cameras, an ambient light sensor, proximity sensor, magnetometer, etc.) for sensing user's movement. The display 1108 provides a graphical user interface (GUI) that displays images and data. In some embodiments, the game device 1110 may have an externally connected display instead of or in additional to the integrated display 1108. The memory 1104 includes one or more of the following: read-only memory (ROM), flash memory, dynamic random access memory (DRAM), static memory and data storage device. In an embodiment, the memory 1104 stores game software 1123 executed by the processor 1106 for updating the game states through game physics in response to the sensed or other input user movement, and updating the display 1108 and audio. The memory 1104 also stores a state estimator 1125 (such as the estimator 500 of FIG. 5) adapted to receive information from one or more peer game devices and the server 1150. In one embodiment, the state estimator 1125 may include code and data executable by the one or more processors 1106. In an alternative embodiment, the state estimator 1125 may be implemented by hardware, firmware, software, or a combination of any of the above.

The operations of the methods of FIGS. 6A, 6B, 7, 8A and 8B have been described with reference to the exemplary embodiments of FIGS. 1, 2A, 2B, 4, 5, 9, 10A, 10B, 11A and 11B. However, it should be understood that the operations of the methods of FIGS. 6A, 6B, 7, 8A and 8B can be performed by embodiments of the invention other than those discussed with reference to FIGS. 1, 2A, 2B, 4, 5, 9, 10A, 10B, 11A and 11B, and the embodiment discussed with reference to FIGS. 1, 2A, 2B, 4, 5, 9, 10A, 10B, 11A and 11B can perform operations different from those discussed with reference to the methods of FIGS. 6A, 6B, 7, 8A and 8B. While the methods of FIGS. 6A, 6B, 7, 8A and 8B show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., computers, servers, mobile devices, etc.). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a processing device performing operations for latency compensation during play of a video game over a network, the video game being played in real-time at least by a first player in a first system and a second player in a second system, wherein both the first player and the second player are human players, the method comprising:
   receiving, by a first estimator in the first system, data values characterizing delayed states of the second system via the network, wherein the first system including the first estimator, the first player, and a first game object controlled by movement of the first player, and the second system including at least the second player and a second game object controlled by movement of the second player;
   estimating, by the first estimator, a latency-compensated state of the second game object using a physics model of the second game object and a behavior model of the second player based on the received data values, wherein the behavior model provides a representation of how the second player interacts with the video game relative to the first player; and
   displaying the second game object on a display of the first system based on the latency-compensated state of the second game object to enable the first player to interact with the video game with compensated latency.

2. The method of claim 1, wherein the received data values include at least a delayed state of the second player and a delayed state of the second game object.

3. The method of claim 1, wherein the received data values include measurements of the second player's movement.

4. The method of claim 1, wherein the estimated current state of the second game object includes at least a position and an orientation of the second game object.

5. The method of claim 1, wherein the first estimator performs non-linear Kalman filtering for producing the latency-compensated state, wherein the non-linear Kalman filtering is Extended Kalman Filtering or Ensemble Kalman Filtering.

6. The method of claim 1, further comprising:
   constructing a signal model for use by the first estimator to estimate states of the second system, wherein the states in the signal model are propagated from one time instant to a next and corrected using the received delayed values, and wherein the states include at least the states of: the physics model of the second game object, the behavior model of the second player and a network model of the network.

7. The method of claim 6, wherein the estimated latency-compensated state is augmented to increase robustness to uncertainty in the behavior model of the second player.

8. The method of claim 1, wherein the physics model of the second game object and the behavior model of the second player forms a closed-loop feedback structure.

9. The method of claim 1, wherein the first estimator further comprises a simplified model of a second estimator in the second system, the output of the second estimator being approximated by a state of the first game object and additive white noise.

10. The method of claim 1, wherein the first estimator further comprises a network model that models time-varying characteristics of the network based on time-stamped packets containing the received data values.

11. The method of claim 1, further comprising: tuning the behavior model to the second player during real-time game play based on game play data of the second player relative to the first player.

12. The method of claim 1, further comprising:
detecting a change of play objective during real-time game play; and
switching from a first sub-model to a second play sub-model of the behavior model in response to the change, wherein the first sub-model is specific to the first play objective and the second sub-model is specific to a new play objective.

13. The method of claim 1, wherein estimating the latency-compensated state of the second game object further comprises:
estimating the latency-compensated state using the behavior model of the second player specific to a current play objective, in parallel with using the behavior model of the second player specific to at least another play objective.

14. The method of claim 1, wherein the behavior model describes cognitive behaviors of the second player at a first time scale and psycho-motor behaviors of the second player at a second time scale, wherein the first time scale is coarser than the second time scale, and wherein each cognitive behavior being specific to a different play objective in the video game.

15. The method of claim 1, wherein the behavior model outputs a state of the second player's motion based on at least a state of the first game object, the second game object, and reference trajectories that describe optimal movement of the first game object with respect to a first play objective.

16. The method of claim 1, further comprising:
constructing a behavior model of the first player during solo play between the first player and an AI (Artificial Intelligent) model in the first system; and
making the behavior model of the first player available to the second player.

17. The method of claim 1, further comprising:
storing the behavior model of the first player with an index that indicates a skill level of the first player.

18. A non-transitory computer-readable storage medium storing instructions, which when executed by a processing device, cause the processing device to perform a method for latency compensation during play of a video game over a network, the video game being played in real-time at least by a first player in a first system and a second player in a second system, wherein both the first player and the second player are human players, the method comprising:
receiving, by a first estimator in the first system, data values characterizing delayed states of the second system via the network, wherein the first system including the first estimator, the first player, and a first game object controlled by movement of the first player, and the second system including at least the second player and a second game object controlled by movement of the second player;
estimating, by the first estimator, a latency-compensated state of the second game object using a physics model of the second game object and a behavior model of the second player based on the received data values, wherein the behavior model provides a representation of how the second player interacts with the video game relative to the first player; and
displaying the second game object on a display of the first system based on the latency-compensated state of the second game object to enable the first player to interact with the video game with compensated latency.

19. The non-transitory computer-readable storage medium of claim 18, wherein the received data values include measurements of the second player's movement.

20. The non-transitory computer-readable storage medium of claim 18, wherein the physics model of the second game object and the behavior model of the second player forms a closed-loop feedback structure.

21. The non-transitory computer-readable storage medium of claim 18, wherein the method further comprises: tuning the behavior model to the second player during real-time game play based on game play data of the second player relative to the first player.

22. The non-transitory computer-readable storage medium of claim 18, wherein the behavior model describes a plurality of cognitive behaviors of the second player, and each cognitive behavior being specific to a different play objective in the video game, and wherein each cognitive behavior being specific to a different play objective in the video game.

23. The non-transitory computer-readable storage medium of claim 18, wherein the behavior model outputs a state of the second player's motion based on at least a state of the first game object, the second game object, and reference trajectories that describe optimal movement of the first game object with respect to a first play objective.

24. The non-transitory computer-readable storage medium of claim 18, wherein the method further comprises:
constructing a behavior model of the first player during solo play between the first player and an AI (Artificial Intelligent) model in the first system; and
making the behavior model of the first player available to the second player.

25. The non-transitory computer-readable storage medium of claim 18, wherein the method further comprises:
storing the behavior model of the first player with an index that indicates a skill level of the first player.

26. A game device of a first player that performs latency compensation during play of a video game over a network, the video game being played in real-time at least by the first player in a first system and a second player in a second system, wherein both the first player and the second player are human players, the game device comprising:
memory;
a display; and
one or more processors coupled to the memory and the display, the one or more processors adapted to execute operations of a first estimator in the first system to perform the following:
receive data values characterizing delayed states of the second system via the network, wherein the first system including the first estimator, the first player, and a first game object controlled by movement of the first player, and the second system including at least the second player and a second game object controlled by movement of the second player;
estimate a latency-compensated state of the second game object using a physics model of the second game object and a behavior model of the second player based on the received data values, wherein the behavior model provides a representation of how the second player interacts with the video game relative to the first player; and display the second game object on the display based on the latency-compensated state of the second game object to enable the first player to interact with the video game with compensated latency.

27. The game device of claim 26, wherein the one or more processors are further adapted to tune the behavior model to the second player during real-time game play based on game play data of the second player relative to the first player.

28. The game device of claim 26, wherein the behavior model describes a plurality of cognitive behaviors of the second player, and each cognitive behavior being specific to a different play objective in the video game, and wherein each cognitive behavior being specific to a different play objective in the video game.

* * * * *